United States Patent
Saad Mahmoud et al.

(10) Patent No.: US 12,146,867 B2
(45) Date of Patent: Nov. 19, 2024

(54) RAPID METHOD FOR DIFFERENT TYPES OF BIOCIDE RESIDUAL WITH ANALYSIS PROCEDURE

(71) Applicant: SAUDI ARABIAN OIL COMPANY, Dhahran (SA)

(72) Inventors: Mohamed Ahmed Saad Mahmoud, Dammam (SA); Ahmed Hamad Al-Salman, Riyadh (SA); Hassan Yahya Al-Malki, Dammam (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 289 days.

(21) Appl. No.: 17/817,604

(22) Filed: Aug. 4, 2022

(65) Prior Publication Data

US 2024/0053305 A1    Feb. 15, 2024

(51) Int. Cl.
*G01N 30/24* (2006.01)
*C02F 1/00* (2023.01)
(Continued)

(52) U.S. Cl.
CPC ............. *G01N 30/24* (2013.01); *G01N 30/14* (2013.01); *G01N 30/30* (2013.01); *G01N 30/68* (2013.01);
(Continued)

(58) Field of Classification Search
CPC .... G01N 30/24; G01N 30/14; C02F 2303/04; C02F 2303/20
See application file for complete search history.

(56) References Cited

U.S. PATENT DOCUMENTS 4,648,043 A * 3/1987 O'Leary ................ B01F 35/82
                                                                            700/285
12,031,901 B2 * 7/2024 Vela ......................... C12Q 1/06
(Continued)

FOREIGN PATENT DOCUMENTS

EP        0016578 B1    1/1985
EP        3835754 A1 *   6/2021  ............. G01N 15/02
(Continued)

OTHER PUBLICATIONS

EP-3835754-A1, English (Year: 2021).*
(Continued)

*Primary Examiner* — Ryan D Walsh
(74) *Attorney, Agent, or Firm* — Osha Bergman Watanabe & Burton LLP (57) ABSTRACT

A method may include transporting a water stream comprising water and a biocide from an upstream location to a downstream location, withdrawing a sample of the water stream to a sample collection and analyses system, preconditioning the sample, injecting the preconditioned sample into an online gas chromatography analyzer, measuring a concentration of the biocide in the sample via the online gas chromatography analyzer to obtain a measurement result, transmitting the measurement result to a control system, and adjusting by the control system, automatically injecting biocide into the water stream at the upstream location based on the biocide dosage requirement on either a batch, or semi-batch, or a continuous basis. A system for measuring and controlling biocide concentration in a water stream in a pipeline may include a sample probe, a cabinet heater, a filtering unit, an online gas chromatography analyzer, a control system, and an injection system.

16 Claims, 6 Drawing Sheets

(51) Int. Cl.
*C02F 1/50* (2023.01)
*G01N 30/02* (2006.01)
*G01N 30/14* (2006.01)
*G01N 30/30* (2006.01)
*G01N 30/68* (2006.01)
*G01N 30/88* (2006.01)

(52) U.S. Cl.
CPC ............... *C02F 1/008* (2013.01); *C02F 1/50* (2013.01); *C02F 2209/003* (2013.01); *C02F 2303/04* (2013.01); *C02F 2303/20* (2013.01); *G01N 2030/025* (2013.01); *G01N 2030/884* (2013.01)

(56) References Cited

U.S. PATENT DOCUMENTS

| | | | | |
|---|---|---|---|---|
| 2014/0343872 A1* | 11/2014 | Ilmola | .............. | G01N 33/48735 702/25 |
| 2015/0300955 A1* | 10/2015 | Al-Moniee | ........ | G01N 21/6486 436/128 |
| 2016/0052797 A1* | 2/2016 | Economedes | ........... | G06F 21/64 210/85 |
| 2020/0371028 A1 | 11/2020 | Osnowski et al. | | |
| 2022/0128468 A1* | 4/2022 | Zhu | ........................ | A01N 35/02 |
| 2024/0003861 A1* | 1/2024 | Al-Ammari | ............ | C02F 1/008 |

FOREIGN PATENT DOCUMENTS

| WO | 2001031330 A1 | 5/2001 |
|---|---|---|
| WO | 2012120278 A1 | 9/2012 |
| WO | 2018037242 A1 | 3/2018 |
| WO | 2022035990 A1 | 2/2022 |

OTHER PUBLICATIONS

Solvay, "Code 4-8776-01: Determination of Tetrakis hydroxy methyl Phosphonium Sulfate (THPS) in Tolcide® PS Biocides," 2 pages.
Dorsey, "Managing open recirculation cooling water systems to minimize contamination and corrosion," Understanding Biocorrosion: Fundamentals and Applications (Book chapter 14), 2014, 15 pages.
McIlwaine, D.B.; "Oilfield application for biocides"; Directory of Microbicides for the Protection of Materials; 2005, pp. 157-175 (19 pages).

* cited by examiner

CALIBRATION CURVE FOR GLUTARALDEHYDE BIOCIDE-BASED CHEMICAL

FIG. 4B

CALIBRATION CURVE FOR THPS BIOCIDE-BASED CHEMICAL

FIG. 5

RAPID METHOD FOR DIFFERENT TYPES OF BIOCIDE RESIDUAL WITH ANALYSIS PROCEDURE

BACKGROUND

In oil exploration and production fields, water is pumped into strategically positioned injection wells to enhance the recovery of oil from the reservoir. The recovery of oil requires the injection of water into oil-bearing reservoir rock in order to move the hydrocarbons to a production well where they can be produced to the surface. The length of the pipeline from the source of the water to the oil field where it is to be injected can be thousands of kilometers. The residence time of water in the pipelines can be significant and the likelihood of the presence of conditions that promote bacteria growth is extremely high. The growth of bacteria in the pipeline can be prevented or greatly inhibited by the addition of a biocide at the water intake point that will have the effect of inhibiting bacterial growth throughout the pipeline.

The distribution pipelines normally form a grid to supply water to a number of injection wells in the vicinity of the production wells. Because of the overall length of the pipeline system, a drop in the effective concentration of biocide can occur during transit to the point of use. The reduction in biocide concentration is due to the degradation of the active ingredient(s) present in the biocide formulation. Hence, it is important to know the actual concentration of biocide present in the water at the point of use.

Biocides are also commonly added to water used in cooling towers and similar industrial systems to combat the growth of bacteria. For most cooling tower installations, the degradation of the biocide is not an issue since the pipelines used with the cooling tower are not of great length; hence the concentration of biocide added remains almost constant throughout the cooling tower system.

Generally, the addition of a biocide or biocides to a distribution pipeline is at the main water intake point. For pipelines, the quantity added at the initial injection point is dependent upon the flow rate of water, ambient pipeline conditions, and the length of the pipeline. The customary biocide treatment method for the biocide addition to an injection water stream is not continuous; rather, the biocide is added into the water system periodically on a fixed schedule that has been determined based on experience.

Many commonly used industrial water treatment biocide formulations contain formaldehyde and/or other compounds having an aldehyde functional group as the active ingredient to combat the growth of bacteria. After the addition of a predetermined amount of biocide over a prescribed time period (commonly referred to as a "slug"), a water sample is collected manually at various downstream sampling points and the samples are taken to a laboratory where any of a number of known analytical methods can be used to detect the presence and determine the concentration of any biocide in the water sample. Once the samples have been received, the laboratory generally requires several hours to analyze and report the concentration of any biocide present in the water system. This practice is followed on a regular basis and after the addition of biocide into the water at the point of water intake. This method of analysis is time-consuming and is not always practical at remote locations along the pipeline. Due to the complexity of some water injection networks in large oil fields, including those at remote locations, the water distribution system cannot be effectively monitored by personnel at the sites for treatment and measurement of residual biocide concentration. Analysis of systems including mixtures of biocides is also complicated due to varied analytical techniques that may be used to analyze the different biocides used. Additionally, due to the high volumetric flow of water and pipeline length, it is often difficult to precisely determine when the biocide slug will arrive at the water sampling point, leading to a missed opportunity.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a method for controlling biocide concentration in biocide-treated water. The method may include transporting a water stream comprising water and a biocide from an upstream location to a downstream location. The method may further include withdrawing a sample of the water stream to a sample collection and analyses system. The method may also include preconditioning the sample in the sample collection and analyses system. Preconditioning of the sample may include heating the sample to produce a preconditioned sample. Furthermore, the method may include injecting the preconditioned sample into an online gas chromatography analyzer, measuring a concentration of the biocide in the sample via the online gas chromatography analyzer to obtain a measurement result, and transmitting the measurement result to a control system—in the sample collection and analyses system. The control system may calculate a biocide dosage requirement. Next, the method may include adjusting by the control system, automatically injecting an amount or a rate of biocide into the water stream at the upstream location based on the biocide dosage requirement. The automatic injection of the biocide may be on either a batch, or semi-batch, or a continuous basis.

In another aspect, embodiments disclosed herein relate to a system for measuring and controlling biocide concentration in a water stream in a pipeline. The system may include a sample probe, a cabinet heater, a filtering unit, an online gas chromatography analyzer, a control system, and an injection system. The sample probe may be used for periodically withdrawing a sample comprising a biocide or a mixture of biocides from the water stream in the pipeline at a downstream location. The cabinet heater may be configured to precondition the sample. The filtering unit may be configured to filter the sample to remove any suspended solids. The online gas chromatography analyzer may be configured to measure a concentration of the biocide or the mixture of biocides in the sample and transmit test results. The control system may be configured to receive the test results transmitted by the online gas chromatography analyzer, calculate, and control an addition or an addition rate of biocide into the water stream at an upstream location based on the test results to maintain the biocide at the downstream location within a concentration range. The injection system may be positioned at the upstream location configured to automatically inject biocide by the control system based on the test results obtained by the online gas chromatography analyzer.

Other aspects and advantages of the claimed subject matter will be apparent from the following description and the appended claims.

In the figures, down are toward or at the bottom, and up is toward or at the top of the figure. "Up" and "down" are generally oriented relative to a local vertical direction. However, "upstream" may more generally refer to objects, units, or processes taken before a particular unit or process. As well, "downstream" may more generally refer to objects, units, or processes taken after a particular unit or process.

DETAILED DESCRIPTION

Certain embodiments of the present disclosure will be described in detail with reference to the accompanying figures. It should be understood, however, that the accompanying figures illustrate the various implementations described and are not meant to limit the scope of various technologies described. Further, in the following detailed description of embodiments of the present disclosure, numerous specific details are set forth in the following detailed description in order to provide a more thorough understanding of embodiments of the present disclosure. However, it will be apparent to one of ordinary skill in the art that the present disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create a particular ordering of the elements nor to limit any element to being only a single element unless expressly disclosed, such as by the use of the terms "before," "after," "single," and other such terminology. Rather the use of ordinal numbers is to distinguish between the elements. By way of an example, a first element is distinct from a second element, and the first element may encompass more than one element and succeed (or precede) the second element in an ordering of elements.

Biocides work effectively to control bacterial growth in different steps of oil and gas applications. Herein, the term "biocide" is used to describe a chemical substance that is used to destroy, render harmless, deter, or have a controlling effect on a harmful organism by biological or chemical means. Oil and gas operations include different phases where bacteria or other organisms can grow, such as crude oil, formation water, the surface of pipelines, and solid surfaces from rock and organic materials. Herein, the term, "control bacterial growth", may refer to the reduced bacteria or other organism cell numbers after applying a biocide in an aqueous medium. To control bacterial growth, the amount or concentration of bacteria in an aqueous medium may be measured utilizing a measurement system, and biocide dosage in the aqueous medium may be controlled based upon the measurement results.

Embodiments disclosed herein generally relate to a system for measuring and controlling biocide concentration in a water stream in a pipeline. The system may include a sample probe, a cabinet heater, a filtering unit, an online gas chromatography analyzer, a control system, and an injection system. Embodiments disclosed herein also relate to a method for controlling biocide concentration in biocide-treated water.

As noted above, oil and gas operations may transport water or other aqueous mixtures from a source, such as a water well, a water supply tank or aqueous fluid supply tank, or other sources and supply points as are commonly used in the oil and gas industry. The water or aqueous mixture is then transported for use at one or more downstream locations or consumption points. For example, the water or aqueous fluid may be injected downhole as part of a secondary oil recovery operation.

The biocide may be introduced to the water or aqueous fluid at or near the source, such as by mixing a biocide or mixture of biocides into a supply tank or into a flow conduit or pipeline that is used to transport the water or aqueous fluid to the downstream locations or consumption points. The biocide may be injected into the pipeline as a solid or liquid form, a concentrated or a diluted form. The point of admixture of the biocide(s) with the water or aqueous fluid may be referred to herein as a biocide injection point. The injected biocide(s) may prevent or limit the growth of bacteria or other organisms that would otherwise grow within the tanks, stagnant zones of the transport conduits (pipes, valves, etc.), and other portions of the flow system during transport from the source to the downstream location(s) or consumption point(s).

In one or more embodiments, the biocide injected may include any of the following aldehyde-based biocidal compounds, including acrolein, formaldehyde, acetaldehyde, and glutaraldehyde. In one or more embodiments, the biocide injected may include any of the following: DBNPA (2,2-dibromo-3-nitrilopropionamide), bronopol (2-Bromo-2-nitro-1,3-propanediol), and tetrakis hydroxymethyl phosphonium sulfate (THPS). In one or more embodiments, the biocide injected may have either acidic pH, or neutral pH, or basic pH. For example, the biocide injected may have a pH value in a range from 0 to 14. For example, the biocide injected may have a pH value in a range from a lower limit of any of 0.01, 0.05, 0.1, 0.5, 1.0, 2.5, 5.0, 1.5, 10.0, 12.0, and 13.0 to an upper limit of any of 0.1, 0.5, 1.0, 2.5, 5.0, 7.5, 10.0, 12.0, 13.0, and 14.0, where any lower limit can be used in combination with any mathematically-compatible upper limit.

In some embodiments, for example, the biocides injected may include a mixture of two or more biocides noted above, such as a mixture of glutaraldehyde and THPS. The biocide may be injected into the water or aqueous fluid on a continuous, or a semi-continuous, or a periodic basis, or a batch, or semi-batch basis. For a non-limiting example, a biocide may be injected into a water stream on a continuous basis. On a continuous basis, an injection system does not close during operation, but rather is open and continuously injects the biocide into the water stream. The injector system may automatically adjust, by a control system, and may inject the biocide at a specific rate into the water stream at an upstream location based on the biocide dosage requirement. For another non-limiting example, a biocide may be injected into a water stream on a batch or semi-batch basis. On a batch or semi-batch basis, an injection system may open and close on demand or periodically, during operation. The injector system may automatically adjust, by a control system, and may inject the biocide at a specific rate into the water stream at an upstream location based on the biocide dosage requirement. One or more biocides may be injected into the water stream such that a biocide may be injected for 5 to 8 hours continuously once a week. A different biocide may be then injected into the water stream in the following week for 5 to 8 hours continuously once a week, and such.

The quantity of biocide(s) injected may be used to determine an initial concentration of the biocide(s) in the water or aqueous fluid, such as based on the volume of water within a supply tank or volumetric flow rate within a pipeline.

During transport from the source downstream, a portion of the biocide may be consumed, due to its interaction with biological organisms, for example. Thus, the concentration of the biocide(s) may decrease from the upstream biocide injection point to the downstream consumption point. As it is desired, for example, to not inject bacteria-laden water into an underground reservoir, sufficient biocide should be injected so as to avoid growth prior to the consumption point. Thus, it may be desirable to have sufficient biocide injected at or proximate to the source (supply tank or into the initial portion of the distribution pipeline, for example) so that there is at least some residual biocide present at the downstream location in which the water or aqueous fluid is to be used.

Systems according to embodiments herein include a sample collection and analysis system intermediate between the biocide injection point and the downstream consumption point. The sample collection and analyses system may be used to measure a remaining concentration of biocide within the water or fluid being transported.

Sample collection and analyses systems useful in embodiments herein may include a sample collection point for withdrawing a representative sample of the fluid being transported within the pipeline. A sample probe may be used for periodically withdrawing a sample from the water stream from the sample collection point. As used herein, a "sample probe" may refer to an enclosed tubular chamber that is inserted into a pipeline containing a water stream for extracting samples for analysis. The sample probe may extend into the midline of the water stream where a sample enters the opening of the sample probe. As used herein, the term "water stream" may refer to any fluid stream that has water in it. The sample may be collected through the sample probe from a mid-stream to get a representative sample from the pipeline. In one or more embodiments, the sample may be collected through a sample probe that is installed in the midline of the water pipeline, such as via a sample line extending into a midstream of the pipeline at a 3 o'clock or 9 o'clock position, for example. In one or more embodiments, the sample probe may be installed at a midline of a pipeline at a perpendicular position to a length of the pipeline to withdraw the sample, where the water stream is flowing, as opposed to withdrawing fluids from along the boundary of the pipeline where flow may be relatively stagnant; a mid-stream sample is more representative of the water flowing within the pipeline, and thus a mid-stream sample is desirable for accurate measurement and control of biocide within the system. In one or more embodiments, the sample probe may be installed at the midline of a pipeline at a perpendicular position to a length of the pipeline, where the water stream is turbulent. In one or more embodiments, the sample probe may be used for periodically withdrawing a sample from the water stream for analysis of the residual (remaining) biocide content.

The sample collection and analysis system includes an online analyzer, such as a gas chromatograph, appropriately calibrated to either measure the concentration of a biocide or simultaneously measure the concentration of biocides in a biocide mixture comprising two or more biocides contained within the sample. The online gas chromatograph may be tied with a control system, in communication with an operational water system, and may be configured to measure, collect, analyze, and transmit test results when obtained. For example, a gas chromatograph having a flame ionization (FID) detector may be used to measure, collect, analyze, and transmit test results in some embodiments. In some embodiments, the analyzer may be calibrated to determine the concentration of multiple biocides within a single sample. The withdrawn sample may be withdrawn from the pipeline and forwarded to the analyzer for analysis of the biocide concentration. Appropriate valving may be provided to limit or control the intake of flow into the sample probe and flow of the sample from the probe to the analyzer.

Due to dead volume within the sample system and the potential for solids to be present in the sample collected, a bleed line may be provided to flush the dead volume with the fresh sample, and a filter may be provided to capture and prevent any solids from entering and potentially plugging the gas chromatograph injector and coil, for example. For a non-limiting example, if a sample contains a high percentage of solids, or solids above a particular size threshold (based on the analyzer injector or coil), the sample may require filtering in multiple filtration stages. A filtering unit may include a porous device such as a mesh, or a membrane, or a cartridge for removing impurities or solid particles from a process water stream containing biocides gas passed through it. The filtering unit may allow biocide to pass through without accumulating it in the unit. A variety of filtering units may be used for separating the impurities or solid particles from the biocide-containing process streams. The filtration unit may include a mechanical, or a biological, or a chemical filtration system. For a non-limiting example, the filtering unit may include a porous membrane to separate suspended solids from a dispersion. In other embodiments, to remove solid particles, a mechanical filtration technique may be used. The solid particles present in a process water stream may include but are not limited to suspended sand, silt, clay, loose scale, inorganic, and organic matter.

Sample collection and analyses systems according to some embodiments herein may include a heater. For example, it may be desirable to maintain the sample at pipeline conditions, and a heater may be provided to control the sample inlet temperature (to the analyzer) at a temperature similar to the pipeline temperature to avoid temperature changes during analysis and any potential impact that fluctuating temperatures may have on a sample and the sample analysis results. In one or more embodiments, the heater may be set to control the sample temperature to be in a range from 40 to 60° C. in order to maintain the sample temperature at the gas chromatography analyzer as matching the water supply line temperature. In other embodiments, preconditioning of a sample may provide for a uniform inlet temperature for each sample, providing for a consistent analyzer inlet temperature from sample to sample, which may provide more accurate results than systems having non-uniform analyzer inlet temperatures as may occur due to day-night temperature differences and the resulting impact on the temperature of the pipeline contents.

In some embodiments, the heater may be a cabinet heater, designed to maintain a temperature within a small enclosure. The cabinet heater may be used to heat the ambient space in the enclosure, and thereby control a temperature of the sample via indirect heat exchange with the ambient air in the enclosure. In one or more embodiments, the cabinet heater may include an electric heating element connected to an external power supply. In some embodiments, the small enclosure including the cabinet heater may be a cabinet housing a portion of the sample line, the filter, the analyzer, and associated gas cylinders (nitrogen or helium and fuel gas air and hydrogen, for example). Filtering and heating of a sample may be referred to herein collectively as preconditioning of a sample and may include other processing of a sample to place it in conditions to which the sample becomes compatible for use in an analyzer's measurement technique (e.g., containing no particles large enough to plug the GC injector or coil).

The arrangement of the valves and flow conduits in the sample flush and preconditioning portions of the sample collection and analyses system may be dependent upon the space available and the configuration of the main flow pipeline at the sample point. In some embodiments, the sample probe/withdrawal line and flush line may include one or more manual valves, such as may be provided for isolation of the sample analyses system for maintenance, and one or more remotely operable control valves. The isolation valves may be normally open, while the control valves may be normally closed and opened when it is desired to sample and analyze the aqueous fluid flowing in the pipeline. A three-way valve may be provided to direct flow to the flush port or to the sample preconditioning and analyzer. Additional valves may be provided for filter or heater maintenance in some embodiments. Additionally, due to the volume between the three-way valve and the analyzer (e.g., the flow conduits, valves, filter volume, etc. disposed of intermediate between the sample valve and the analyzer), a flow conduit may be provided to flush fluid up to the analyzer injector or may include flow conduits to introduce nitrogen, for example, to flush or back flush the sample line intermediate the sample probe or the three-way valve and the analyzer. Other arrangements to minimize the stagnant liquid holdup within the system that may impact sample analyses may also be used.

After pre-conditioning, the sample may be tested to measure the biocide concentration in the sample. The filtered sample may be first introduced into the analyzer configured to measure the concentration of the biocide(s) and output test results. Test results obtained by the gas chromatography analyzer may then be transmitted and used to adjust injection rates of the biocide(s) at the injection point. In some embodiments, the analyzer results providing a concentration of one or more biocides present at the sample point may be transmitted to a control system configured to adjust biocide injection rate(s) at the injection point, thereby increasing or decreasing the amount of biocide injected so as to more optimally approach the desired minimum biocide content in the system at the sample location, and thus providing sufficient biocide at the end consumption point, such as an injection well, while also avoiding over-injection of biocide. In this manner, sample handling and analyses according to embodiments herein may determine concentrations of two different types of biocides (THPS and Aldehydes derivatives, for example), and this method can be utilized for oil and gas water pipelines to either determine the residual concentration of biocides, which is usually from 500-1000 ppm and evaluation of the biocide efficiency and dosage optimization.

The control system may use the measurement data generated by the gas chromatography analyzer to control biocide addition back at the injection point creating a loop of operation. The control system further may control the injection system positioned at an upstream location. The injection system may periodically inject an addition of biocide at the upstream of the water stream and may maintain a biocide concentration range in the downstream location that can be further measured, and the measurement data can help the control system send signals to the upstream for biocide addition based on a given set of parameters.

In one or more embodiments, the control system may automatically calculate the biocide dosage requirement by evaluating a biocide efficiency. In one or more embodiments, the control system may be utilized for controlling an online biocide measurement system that may periodically monitor a biocide concentration in a process stream in both upstream and downstream locations. In one or more embodiments, the control system may be configured to periodically actuate the sample collection and analyses system. The control system may calculate the biocide efficiency and dosage requirement based on the biocide concentration measurements of the process stream and may control an injection system for injecting a controlled amount of biocide into the water stream at an upstream location. In one or more embodiments, the control system may be a distributed control system (DCS) that evaluates a biocide efficiency.

When the sample collection and analyses system is proximate (minimally upstream of, such as within 100 or 500 meters of) the consumption point, having a minimum residual may be sufficient, such as 10, 50, 100, 500, or 1000 ppm residual biocide. When the sample collection and analyses system is further upstream, such as greater than 2 km upstream as may occur on large distribution pipelines, that minimum residual may be desirably higher to account for continued consumption of biocide from the sample location to the consumption point.

Figure 1:
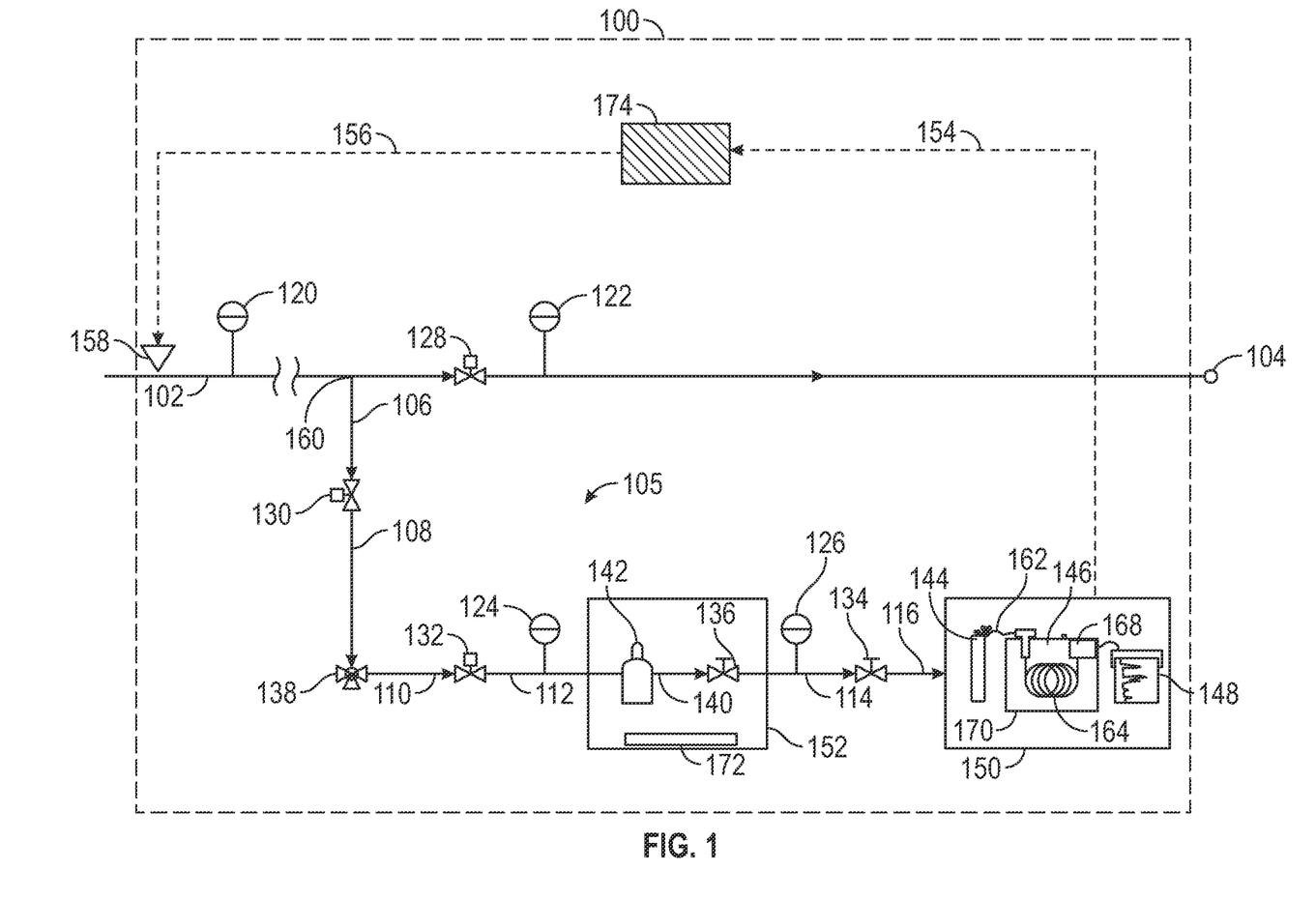
FIG. 1 illustrates a schematic diagram of a biocide measurement and control system according to embodiments herein that include pipelines, pressure indicators, control valves, an injector, a sample collector, a heating cabinet, an online gas chromatography analyzer connected to a control system unit for periodical and regular monitoring of a biocide, and biocide injection in an aqueous system.

A simplified flow diagram of a biocide measurement and control system 100 according to embodiments herein is illustrated in FIG. 1. As shown in FIG. 1, the biocide measurement and control system 100 includes an injection system 158 at an upstream position for injecting a known concentration of biocide into a process stream in the pipeline 102 and the biocide-containing process stream flows downstream toward the end-use or consumption point 104, such as an injection well. Pipeline 102 may be present at an upstream position connecting the process water source, such as a tank, well, or another source, as well as pumps and other equipment (not illustrated) for transmitting the aqueous fluid and injected biocide downstream toward the end-use or consumption point 104 at a downstream location.

Intermediate of the injection system 158 and the end use or consumption point 104 may be positioned in a sample collection and analysis system 105 as described above. The sample collection and analysis system may be positioned, for example, proximate to the consumption point so as to provide an accurate analysis of the biocide concentration at the point of consumption.

The sample collection and analysis system 105 may include a sample probe 160, extending into a mid-flow point of pipeline 102 to enable withdrawing of a representative sample into flow line 106 upon opening of valve 130 and three-way valve 138. The volume of the flow line 106, and 108 may be purged through valve 138, and when a sufficient volume has been purged to have a representative sample in flow line 108, the three-way valve may be used to divert the sample flow toward flow lines 110, 112. The sample may then be preconditioned in cabinet 152, which may include a cabinet heater 172 and a filter 142. The preconditioned sample may then be fed via flow lines 114, and 116 to the gas chromatography analyzer 150. The analyzer, such as a gas chromatograph, may be contained within a separate housing or within the same enclosure or the cabinet 152 housing the cabinet heater and filter used for preconditioning of the sample.

The gas chromatography analyzer 150 may include a gas supply 144, a sample injector 162, a column 164, an oven 170, a detector 168, and a recorder 148. The gas chromatography analyzer 150 may be in communication with a control system 174 through a communication line 154.

The control system 174 may further be in communication with the injection system 158 through a second communication line 156. The control system may be configured to manipulate injection system 158, for injection of a desired amount of biocide into the process water in pipeline 102, based upon the measurement results and the indicated biocide efficiency.

As illustrated in FIG. 1, the system may include various additional valves (132, 128, 136, 134) and pressure or temperature measurement devices (120, 122, 124, 126) for isolating, controlling, and/or monitoring the sample collection and analysis system 105. Valves 134, and 136 may be needle valves in some embodiments.

Embodiments of the sample collection and analysis system described above may be used to more efficiently and more accurately measure and control biocide concentrations within a flow line, such as a water distribution network for providing water from a water supply source to one or more consumption points, such as injection wells. This may be illustrated by comparing the test methods as shown in FIGS. 2 and 3, for example.

Figure 2:
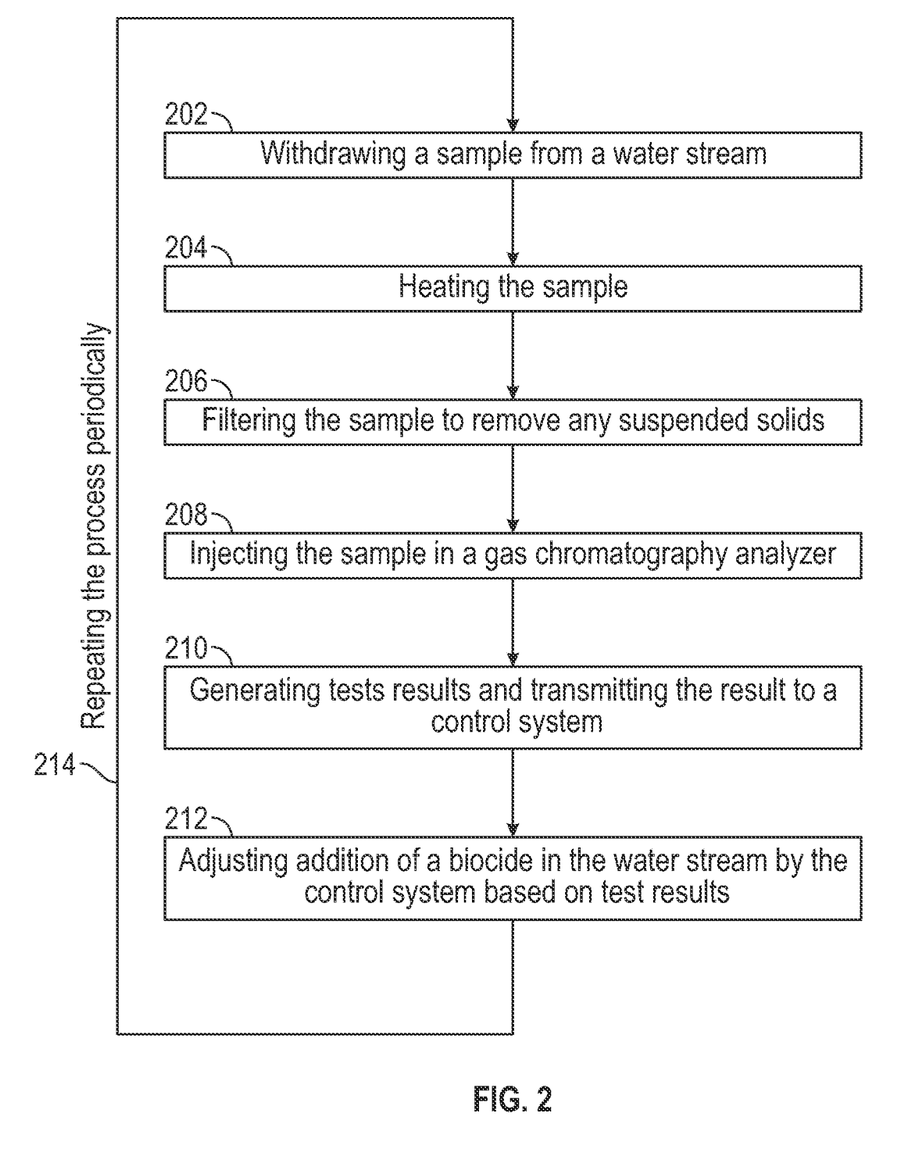
FIG. 2 is a process flow chart of the biocide sampling, testing, and analyzing method according to one or more embodiments.

FIG. 2 is a process flow chart of the biocide sampling, testing, and analyzing method according to one or more embodiments. As shown in FIG. 2, the method for controlling biocide concentration in biocide-treated water may include several steps, including first withdrawing a biocide-containing sample from a water stream in step 202, where the biocide-containing sample may be collected in a sample probe from a water stream at a downstream location. The method further includes heating the sample in step 204, where a heater such as a cabinet heater may be used for preconditioning the sample. Additionally, the method may include filtering the sample to remove any suspended solids in the sample in step 206 and injecting the sample into a gas chromatography analyzer in step 208. The method also may include generating test results and transmitting the result to a control system in step 210. Lastly, the control system may adjust the addition of a biocide into the water stream, based on test results, in step 212.

Figure 3:
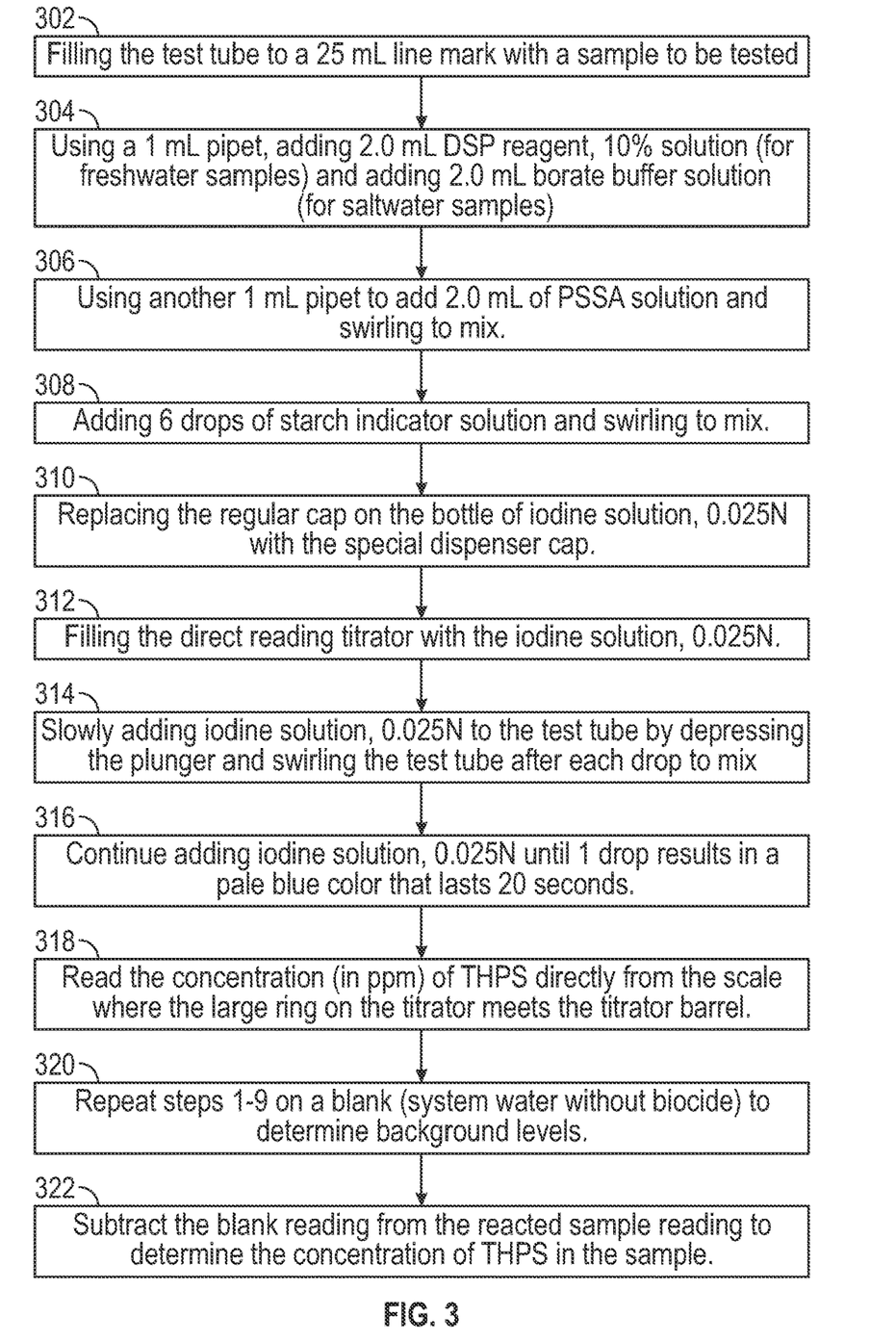
FIG. 3 is a process flow chart of a biocide sampling, testing, and analyzing following a conventional method.

In contrast, FIG. 3 is a process flow chart of a biocide sampling, testing, and analyzing following a conventional method. As shown in FIG. 3, the conventional method for manually sampling, testing, and analyzing for THPS may include several steps including first filling the test tube to a 25 mL line mark with a sample to be tested in step 302. The method then may include using a 1 mL pipet, adding 2.0 mL DSP reagent, 10% solution (for freshwater samples), and adding 2.0 mL borate buffer solution (for saltwater samples) in step 304. The method further may include using another 1 mL pipet to add 2.0 mL of PSSA solution and swirling to mix in step 306. Additionally, the method may include adding 6 drops of starch indicator solution and swirling to mix in step 308. In step 310 of the method, the method may include replacing the regular cap on the bottle of iodine solution, 0.025N with the special dispenser cap. The method may further include filling the direct reading titrator with the iodine solution, 0.025N in step 312, and slowly adding iodine solution, 0.025N to the test tube by depressing the plunger and swirling the test tube after each drop to mix in step 314. The method may also include continuing adding iodine solution, 0.025N until 1 drop results in a pale blue color that lasts 20 seconds in step 316, and then reading the concentration (in ppm) of THPS directly from the scale where the large ring on the titrator meets the titrator barrel in step 318. Steps 302-318 may then be repeated on a blank (system water without biocide) to determine background levels in step 320. Finally, the conventional method may include subtracting the blank reading from the reacted sample reading to determine the concentration of THPS in the sample.

Measurements of THPS with the conventional test method may have interference in the presence of other chemicals including hydrogen sulfide, whereas embodiments herein may not have any interference in the presence of hydrogen sulfide in the sample. Further, iodometric titration according to the conventional test method may be subjected to interference with the presence of sulfite-based oxygen scavenger chemical which may result in a higher biocide concentration than the actual biocide concentration. Additionally, measurements of THPS with the conventional test method may be sensitive to pH adjustment, whereas embodiments herein may not have such sensitivity to pH adjustment and may not require any pH adjustment of the sample prior to analyzing biocide concentrations. Further, in the conventional method, pH adjustment of the sample may cause partial degradation of a biocide present in the sample.

Embodiments herein further avoid re-standardizing iodine reagent before each test, which may require more time to measure THPS concentrations in the sample. The conventional test method for measuring THPS is based on colorimetric titration, which may involve human error, whereas the disclosed method may be free from such human error.

Further still, the conventional test method for measuring THPS may further require dilution of the biocide-containing sample in order to measure the concentration of biocide in the sample by utilizing a spectrophotometer as an alternative to measuring the color-change due to titration. Embodiments herein may eliminate the error of the dilution process that may be required for high concentrations to fall within a specific spectrophotometer wavelength.

The conventional test method for measuring THPS may include sample pretreatment with a buffer that may form a white precipitate and may interfere with the color development during the titration process. There may not be any precipitate forming with the presently disclosed method.

In one or more embodiments, the presently disclosed test method may be more advantageous compared to the described, conventional test method in order to reduce the time required for biocide measuring and dosage significantly and avoid contaminations from field chemicals interference such as oxygen scavenger, corrosion inhibitor, and scale inhibitor.

In one or more of embodiments, other conventional test methods may be utilized for measuring aldehyde-based biocides such as glutaraldehyde. The conventional test method for measuring glutaraldehyde concentration may be a lengthy test procedure that may take 2 hours for measuring each sample. The test conventional test method for measuring glutaraldehyde may also require hazardous chemicals such as oxidizing agents that may cause interference with other compounds in the sample. The disclosed test method may be used without any oxidizing agent and may take about 20 minutes for measuring each sample.

In one or more of embodiments, the disclosed method may reduce the test results turnaround time compared to the conventional test method at least by 40%, or by 50%, or by 60%, or by 70%, or by 80%, or by 90%.

EXAMPLES

The following examples are provided to illustrate embodiments of the present disclosure. The Examples are not intended to limit the scope of the present invention, and they should not be so interpreted.

Materials

Four biocide samples were tested, where two biocide samples were glutaraldehyde having commercial names BT-15607 and BIOC31125A. The other two biocide samples tested were THPS having commercial names BT-4535 and BACTRON B1705. Glut, BT-16607, and THPS, BT-4535 were sourced from the manufacturer, Clariant. Glutaraldehyde, BIOC31125A, and THPS, and BACTRON B1705 were sourced from the manufacturer, Nalco-Champion. The chemical structures of the tested biocide samples, (i) glutaraldehyde and (ii) THPS are as follows:

Calibration Curve

In order to measure the biocide concentrations accurately, the gas chromatography analyzer was calibrated following the detailed operating parameters discussed herein. Three standard solutions having different concentrations of each biocide were prepared in test tubes by measuring biocides and untreated process water gravimetrically in the following steps:

0.05 grams (gm) of a standard solution of each biocide were transferred into 100 ml calibrated volumetric flasks. The biocide-containing volumetric flasks were made up to 100 milliliters (ml) by using untreated process water to get 500 parts per million per weight (ppm/wt) of each standard biocide solutions.

0.1 gm from each biocide were transferred into 100 ml calibrated volumetric flasks. The biocide-containing volumetric flasks were made up to 100 ml by using untreated process water to get 1000 ppm/wt of standard biocide solutions.

0.2 gm from each biocide were transferred into a 100 ml calibrated volumetric flask. The biocide-containing volumetric flasks were made up to 100 ml by using untreated process water to get 2000 ppm/wt of standard biocide solutions.

The separation of the biocides was achieved through an inert separation capillary column. The column was set at a temperature of 170 to 200° C. by the programming oven and a flame ionization detector (FID) was utilized to detect biocide molecules, and therefore, their concentrations in the test samples. An inert carrier gas, helium was used with a high purity of 99.995%. The inert, helium gas was at a pressure of 20.0 pounds per square inch (psi), and the septum purge flow rate was at 3 milliliters per minute (ml/min). Each standard solution was injected in 1 microliter (IL) volume into the gas chromatography inlet at 200° C. by utilizing a through Split/Split less injector. A recorder present in the gas chromatography analyzer was utilized for converting the detected signals into a readable, measurement data.

In order to prepare the calibration curve, and also to analyze samples, all tools, and equipment that may come across test fluid contact, were cleaned and dried prior to use in order to avoid any contamination. Also, all the samples were analyzed within one hour of preparation or collection, especially for the water source that contains high bacteria populations.

Figure 4A:
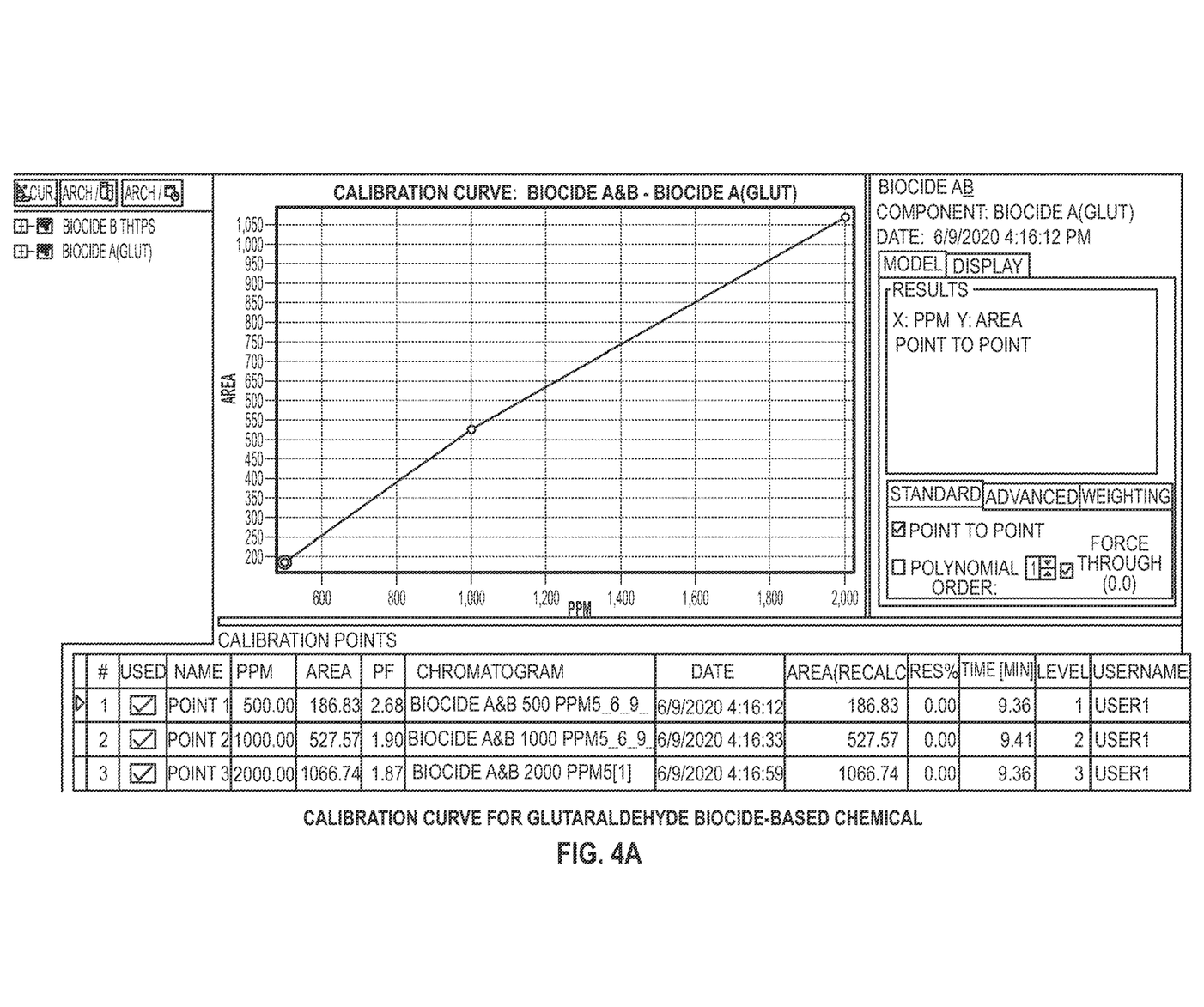
FIG. 4A illustrates a graphical representation of the calibration for measuring a glutaraldehyde biocide concentration in an aqueous sample using the biocide measurement system.

FIG. 4A illustrates a graphical representation of the calibration for measuring a glutaraldehyde biocide concentration in an aqueous sample using the biocide measurement system.

Figure 4B:
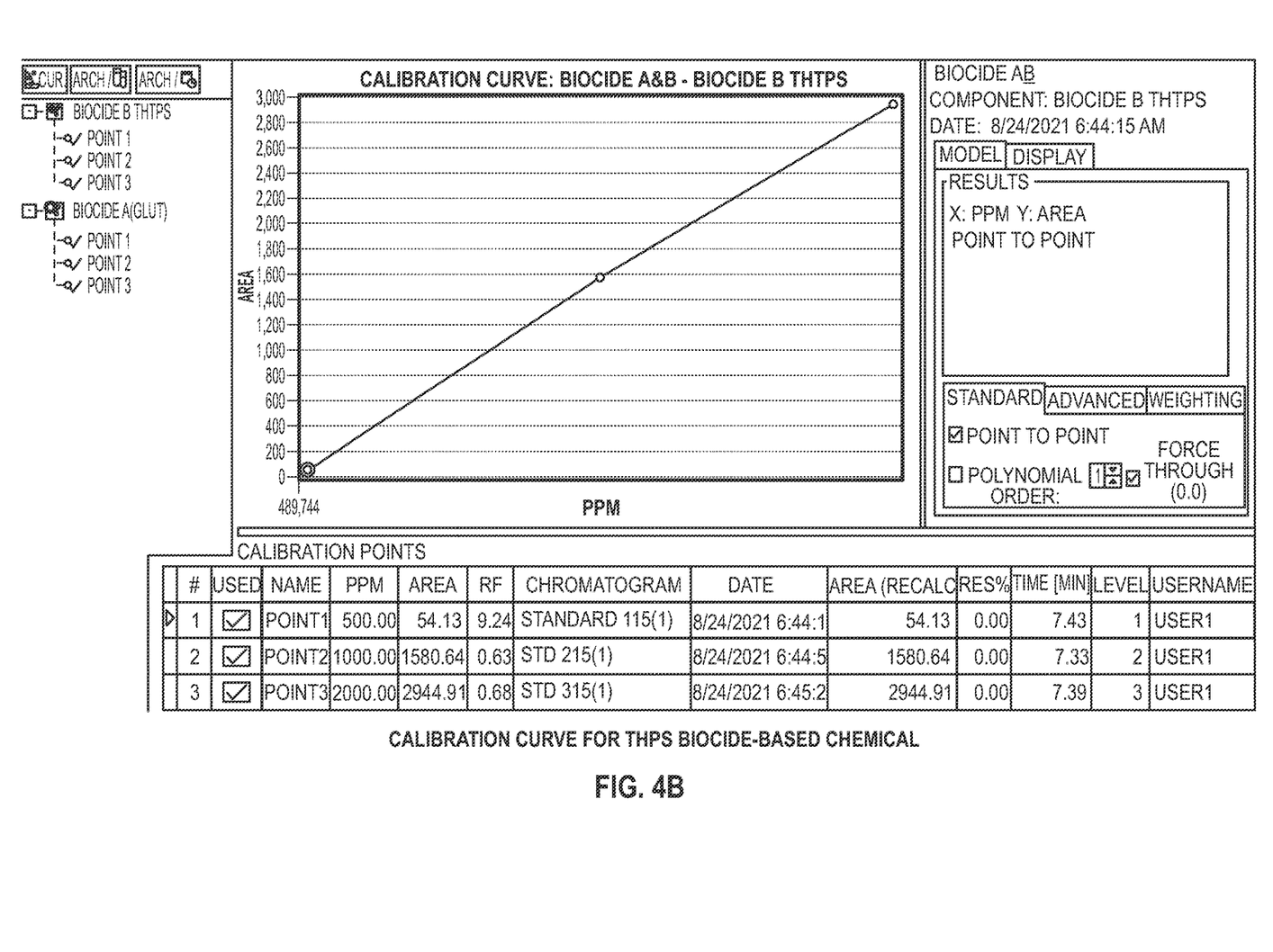
FIG. 4B illustrates a graphical representation of the calibration for measuring a tetrakis(hydroxymethyl)phosphonium sulfate biocide concentration in an aqueous sample using the biocide measurement system.

FIG. 4B illustrates a graphical representation of the calibration for measuring a tetrakis(hydroxymethyl)phosphonium sulfate biocide concentration in an aqueous sample using the biocide measurement system.

As shown in the FIG. 4A and FIG. 4B, two calibration curves were generated for each biocide—glutaraldehyde and THPS. The calibration curves were established automatically by calculating the area under peaks for each individual concentration against the standard concentration at a specific retention time. The calibration curves were later used for measuring biocide-containing samples.

Figure 5:
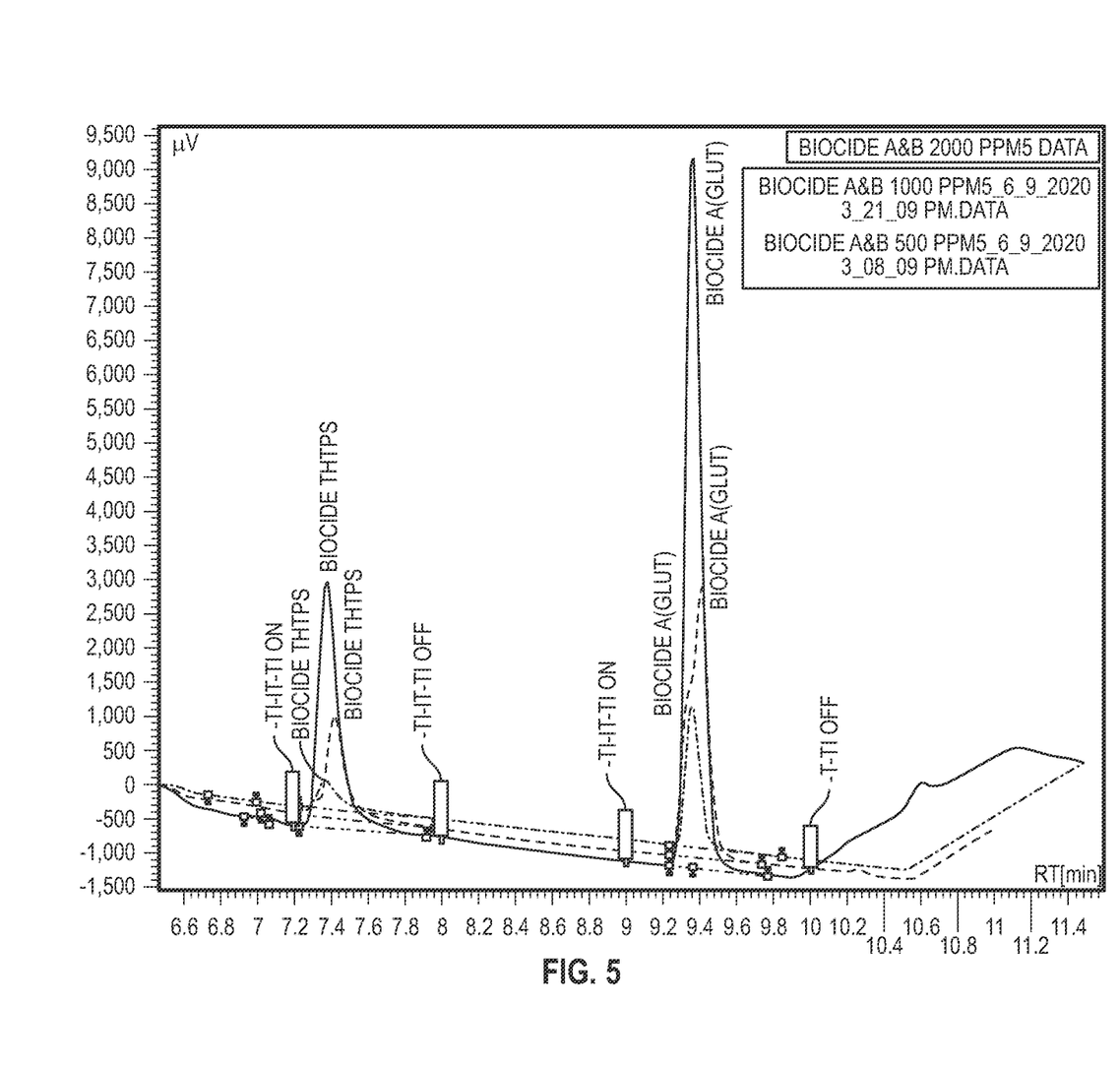
FIG. 5 graphically depicts a peak-by-peak response to the presence of a biocide in standard biocide solutions that is measured in an online gas chromatography analyzer.

FIG. 5 graphically depicts a peak-by-peak response to the presence of a biocide in standard biocide solutions that is measured in an online gas chromatography analyzer. As shown in the FIG. 5, peaks overlap for different concentrations of biocide from 500 ppm up to 2000 ppm.

Sample Testing

Test samples containing at least a biocide in a process water were collected and analyzed via the same test method as described above. Each biocide-containing sample was injected into the gas chromatography analyzer inlet in 1 μL volume at 200° C. by utilizing a through Split/Split less injector. The recorder was utilized for converting the detected signals into a readable, measurement data.

Water pipeline geochemical analysis was conducted prior to any testing. The test results showed high dissolved solids, sulfate, and chloride ions present in the tested process water. The presence of such chemicals and dissolved solids may interfere with the buffers and reagents for conventional biocide testing methods, but not with the disclosed test method as shown later in the examples. The parameters of the biocide-containing samples are given below in the Table 1.

TABLE 1

| Test Parameter | Result | Unit | Test Method |
|---|---|---|---|
| Specific Gravity | 1.1577 | — | — |
| pH | 6.16 @ 23.2° C | — | ASTM D1293 |
| Total Suspended Solids | 350 | | APHA 2540-D |
| Total Dissolved Solids (TDS) | 78594.0 | mg/L | APHA 2540-C |
| Hydroxide Alkalinity (OH—) | 0 | mg/L as CaCO3 | APHA 2320 (B) |
| Carbonate Alkalinity ($CO_3^{2-}$) | 0 | | |
| Bicarbonate Alkalinity ($HCO_3^-$) | 152.83 | | |
| Chloride ($Cl^-$) | 44194.59 | mg/L | APHA 4500-CL (D) |
| Sulfate ($SO_4^{2-}$) | 1325.0 | mg/L | ASTM D512 |
| Sodium ($Na^+$) | 20830 | mg/L | ASTM D1976 |
| Calcium ($Ca^{2+}$) | 4572 | | |
| Magnesium ($Mg^{2+}$) | 546 | | |
| Potassium ($K^+$) | 1578 | | |
| Iron (Fe2+) | 8.42 | | |
| Manganese (Mn) | 1.25 | | |

Example 1

Table 2 shows a comparative concentration data of biocide glutaraldehyde between the conventional test method and the disclosed method. As shown in the Table 2, the difference between the biocide concentration data following the conventional test method and the disclosed test method was 7% or less.

TABLE 2

| Sample Date | Biocide Type | Conventional Method by Spectrophotometer in ppm | Disclosed Method Concentration in ppm | Difference in ppm |
|---|---|---|---|---|
| Aug. 9, 2021 | Glutaraldehyde | 540.3 | 572.5 | 32.2 |
| Aug. 23, 2021 | | 445.8 | 420.6 | 25.2 |
| Nov. 29, 2021 | | 673.5 | 640.8 | 32.7 |
| Dec. 13, 2021 | | 448.3 | 477.6 | 29.3 |

Table 3 shows a comparative concentration data of biocide THPS in between the conventional test method and the disclosed method. As shown in the Table 3, the difference between the biocide concentration data following the conventional test method and the disclosed test method was 9% or less.

TABLE 3

| Sample Date | Biocide Type | Traditional Method by Spectrophotometer in ppm | Invented Method Concentration in ppm | Difference in ppm |
|---|---|---|---|---|
| Aug. 9, 2021 | THPS | 410 | 445.3 | 35.3 |
| Aug. 23, 2021 | | 350 | 380.9 | 30.9 |
| Nov. 29, 2021 | | 510 | 490.6 | 19.4 |
| Dec. 13, 2021 | | 400 | 420.6 | 20.6 |

Embodiments of the present disclosure may provide at least one of the following advantages. There is a need for in-line and real-time sensing devices for continuous monitoring of biocidal chemicals in these geographically extensive and complex water distribution systems. A system in which such test information is recorded and that can transmit the data from remote locations to personnel responsible for the system is needed. The biocide measurement system disclosed herein solves problems with having different test methods for different types of biocides in conventional systems. Such problems may include long time and labor requirements. The biocide measurement system disclosed herein may identify the type of the injected chemical within 20 minutes, eliminate the error of the dilution process that required for high concentrations to fall within spectrophotometer wavelength, avoid pH adjustment of the water sample which usually causes partial degradation of the injected biocide, and avoid interference with other field chemicals such as corrosion inhibitors, scale inhibitor and oxygen scavenger that contain similar function group of biocides. In addition, the system also eliminates the use of highly toxic and oxidizing agent such as ferric chloride, avoid a human error that affects the final biocide concentration for the colorimetric titration process, which might be different from one technician to another, and reduce or eliminate the need for chemicals or test field kits. Overall, embodiments of the present disclosure may provide three key advantages: (1) enhancing the reliability of an established injection water treatment program by the timely detection of biocide residuals and adjusting upstream operating parameters and conditions accordingly to provide adequate control of any bacterial activity in the system, (2) minimizing potentially serious and costly downhole bacterial growth problems resulting from the depletion of biocide in a geographically extensive seawater distribution system and enhancing the effectiveness of bacterial control and the water quality in remote areas; and (3) avoiding the addition of an unnecessary excess of biocide to the injection water system thereby achieving cost savings and reducing the amount of biocide used.

Unless defined otherwise, all technical and scientific terms used have the same meaning as commonly understood by one of ordinary skill in the art to which these systems, apparatuses, methods, processes, and compositions belong.

The singular forms "a," "an," and "the" include plural referents, unless the context clearly dictates otherwise.

As used here and in the appended claims, the words "comprise," "has," and "include" and all grammatical variations thereof are each intended to have an open, non-limiting meaning that does not exclude additional elements or steps.

"Optionally" and similar terms refer to a subsequently described event or circumstance that may or may not occur. The description includes instances where the event or circumstance occurs and instances where it does not occur.

"Substantially" and similar terms refers to a majority of, or mostly, as in at least about 50%, 60%, 70%, 80%, 90%, 95%, 96%, 97%, 98%, 99%, 99.5%, 99.9%, 99.99%, or at least about 99.999% or more.

When the word "approximately" or "about" is used, this term may mean that there can be a variance in the value of up to ±10%, of up to 5%, of up to 2%, of up to 1%, of up to 0.5%, of up to 0.1%, or up to 0.01%.

Ranges may be expressed as from about one particular value to about another particular value, inclusive. When such a range is expressed, it is to be understood that another embodiment is from the one particular value to the other particular value, along with all particular values and combinations thereof within the range.

While particular embodiments of the invention have been described, it will be understood that the invention is not limited thereto, since many modifications can be made, and it is intended to include within the invention any such modifications as fall within the scope of the claims.

While the disclosure includes a limited number of embodiments, those skilled in the art, having the benefit of this disclosure, will appreciate that other embodiments may be devised which do not depart from the scope of the present disclosure. Accordingly, the scope should be limited only by the attached claims.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed:

1. A method for controlling biocide concentration in biocide treated water, the method comprising:
   transporting a water stream comprising water and a biocide from an upstream location to a downstream location;
   intermediate an upstream location and a downstream location, withdrawing a sample of the water stream to a sample collection and analyses system;
   in the sample collection and analyses system:
      preconditioning the sample, wherein preconditioning of the sample comprises heating the sample to produce a preconditioned sample;
      injecting the preconditioned sample into an online gas chromatography analyzer;
      measuring a concentration of the biocide in the sample via the online gas chromatography analyzer to obtain a measurement result;
      transmitting the measurement result to a control system, wherein the control system calculates a biocide dosage requirement; and
   either on a batch or a semi-batch basis, adjusting by the control system, automatically injecting an amount of biocide into the water stream at the upstream location based on the biocide dosage requirement; or
   on a continuous basis, adjusting by the control system, automatically injecting a rate of biocide injection into the water stream at the upstream location based on the biocide dosage requirement.

2. The method according to claim 1, wherein the control system calculates the biocide dosage requirement by evaluating a biocide efficiency.

3. The method according to claim 1, wherein the online gas chromatography analyzer is calibrated to measure simultaneously a concentration of biocides in a biocide mixture comprising two or more biocides.

4. The method according to claim 1, wherein preconditioning the sample comprises heating the sample in a cabinet heater.

5. The method according to claim 1, wherein preconditioning the sample further comprises filtering the sample.

6. The method according to claim 1, wherein the control system is further configured to periodically actuate the sample collection and analyses system.

7. The method according to claim 1, wherein the control system is configured to maintain a concentration of biocide in the water stream at the downstream location in a range from 500-1000 ppm.

8. The method according to claim 1, wherein the biocide is one or more of the following:
   aldehyde-based biocidal compounds including acrolein, formaldehyde, acetaldehyde, and glutaraldehyde.

9. The method according to claim 1, wherein the biocide in the sample is one or more of the following:
   DBNPA (2,2-dibromo-3-nitrilopropionamide), bronopol (2-Bromo-2-nitro-1,3-propanediol), and tetrakis hydroxymethyl phosphonium sulfate (THPS).

10. The method according to claim 1, wherein the biocide and the sample have either acidic pH, or neutral pH, or basic pH.

11. A system for measuring and controlling biocide concentration in a water stream in a pipeline, comprising:
    a sample probe for periodically withdrawing a sample comprising a biocide or a mixture of biocides from the water stream in the pipeline at a downstream location;
    a cabinet heater for preconditioning the sample;
    a filtering unit for filtering the sample to remove any suspended solids;
    an online gas chromatography analyzer, the online gas chromatography analyzer being configured to measure a concentration of the biocide or the mixture of biocides in the sample and transmit test results;
    a control system configured to receive the test results transmitted by the online gas chromatography analyzer, calculate, and control an addition or an addition rate of biocide into the water stream at an upstream location based on the test results to maintain the biocide at the downstream location within a concentration range; and
    an injection system positioned at the upstream location configured to inject biocide by the control system based on the test results obtained by the online gas chromatography analyzer.

12. The system according to claim 11, wherein the injection system is either manually operated by an operator or automatically controlled by the control system.

13. The system according to claim 11, wherein the online gas chromatography analyzer is configured to measure the concentration of a biocide mixture of two or more biocides, and to measure to the concentration of biocides simultaneously.

14. The system according to claim 11, wherein the sample probe is installed in the pipeline at a position where flow of the water stream is turbulent.

15. The system according to claim 11, wherein the control system is a distributed control system (DCS) configured to calculate and control biocide addition based on a biocide efficiency.

16. The system according to claim 11, wherein the cabinet heater is configured to control a temperature of the sample at an inlet of the online gas chromatography analyzer to match a temperature of the water stream in the pipeline.

* * * * *